(12) United States Patent
Ishibashi et al.

(10) Patent No.: US 6,980,490 B2
(45) Date of Patent: Dec. 27, 2005

(54) OPTICAL DISK AND MANUFACTURING METHOD FOR THE SAME

(75) Inventors: Kenzo Ishibashi, Moriguchi (JP); Yasumori Hino, Ikoma (JP); Yasuyuki Miyaoka, Yokohama (JP); Hirotake Ando, Tokyo (JP)

(73) Assignees: Matsushita Electric Industrial Co., Ltd., Osaka (JP); Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/860,671

(22) Filed: Jun. 2, 2004

(65) Prior Publication Data

US 2004/0218476 A1 Nov. 4, 2004

Related U.S. Application Data

(63) Continuation of application No. 10/123,359, filed on Apr. 16, 2002, now abandoned.

(30) Foreign Application Priority Data

Apr. 19, 2001 (JP) .............................. 2001-120689

(51) Int. Cl.[7] .............................................. G11B 11/00
(52) U.S. Cl. ............................... 369/13.27; 369/13.42; 369/13.55; 369/275.4
(58) Field of Search ...................... 369/13.27, 13.55, 369/13.42, 13.06, 13.4, 94, 13.54, 13.35, 369/275.3, 275.4, 13.47, 13.07; 428/64.4, 428/694 ML

(56) References Cited

U.S. PATENT DOCUMENTS

| | | | |
|---|---|---|---|
| 5,821,004 A | * | 10/1998 | Hino et al. ................. 428/819 |
| 5,936,915 A | | 8/1999 | Fujii et al. |
| 5,966,348 A | | 10/1999 | Hashimoto et al. |
| 5,995,472 A | | 11/1999 | Fujii et al. |
| 6,027,825 A | | 2/2000 | Shiratori et al. |
| 6,249,489 B1 | | 6/2001 | Fujii et al. |
| 6,399,174 B1 | | 6/2002 | Shiratori et al. |
| 6,403,148 B1 | | 6/2002 | Shiratori et al. |
| 6,614,731 B2 | | 9/2003 | Ishii |
| 6,690,626 B2 | | 2/2004 | Birukawa et al. |

FOREIGN PATENT DOCUMENTS

| | | |
|---|---|---|
| JP | 6-290496 | 10/1994 |
| JP | 8-147777 | 6/1996 |
| JP | 10-91938 | 4/1998 |
| JP | 10-340493 | 12/1998 |
| JP | 11-126381 | 5/1999 |
| JP | 11-126386 | 5/1999 |

* cited by examiner

Primary Examiner—Ali Neyzari
(74) Attorney, Agent, or Firm—Hamre, Schumann, Mueller & Larson, P.C.

(57) ABSTRACT

An optical disk is made of tracks that are magnetically separated from one another by scanning a focused light beam over lands between tracks at a predetermined power and annealing to lower the magnetic anisotropy of a magnetic layer on the lands, and is provided with a power testing region comprising one or more tracks for finding the predetermined annealing power at the location of at least one of the group consisting of a specific region within the data region, a region more to the inner side than the innermost track of the data region, and a region more to the outer side than the outermost track of the data region. Thus, an optical disk and a manufacturing method for the same can be provided that have a high recording density and with which annealing can be implemented in a short time and at the correct annealing width.

18 Claims, 9 Drawing Sheets

OPTICAL DISK AND MANUFACTURING METHOD FOR THE SAME

This application is a continuation of application Ser. No. 10/123,359, filed Apr. 16, 2002 now abandoned, which application is incorporated herein by reference.

BACKGROUND OF THE INVENTION

1. Field of the Invention

The present invention relates to an optical disk used for the recording and reproduction of information, and a method for manufacturing the same.

2. Description of Related Art

In the field of optical disks, there is a demand for information to be recorded at ever higher densities. To achieve higher density recordings, it has been proposed to record optical disks by DWDD (domain wall displacement detection), which is a type of super-resolution technology.

In DWDD optical disks the magnetic coupling between adjacent recording tracks must be weakened (reduction of magnetic anisotropy). Thus, in the manufacture of DWDD optical disks, an initialization (hereinafter referred to as "annealing", "annealing method", or "annealing process") is performed to weaken the magnetic coupling between adjacent recording tracks before information signals are recorded. A method for such annealing has been reported in the prior art (see JP-H06(1994)-290496A and JP-H10 (1998)-340493A).

An example of the structure of a conventional optical disk and annealing method for the same is shown in FIG. 9. As FIG. 9 shows, a conventional optical disk 1 is provided with a substrate 2, and a first dielectric layer 3, a recording layer 4, a second dielectric layer 5, and a protective coat layer 6 sequentially layered on the substrate 2. Grooves 2a are formed in the surface of the substrate 2 on the recording layer 4 side. The area between two radially adjacent grooves 2a is called a land, and serves as the recording track. The width of the grooves 2a is 0.2 µm, for example, and the width of the land portion is 1.4 µm. The recording layer 4 is provided with three or more magnetic layers for reproduction by DWDD.

The method of annealing the optical disk 1 will be described next. In the optical disk 1, the magnetic coupling of the recording layer 4 above the grooves 2a is erased by irradiating laser light 7 (laser power: 10 mW, λ=780 nm, objective lens 8 of NA=0.5, diameter of laser spot: approximately 800 nm) for the annealing along the grooves 2a. In this annealing process, the movement speed of the laser spot of the laser light 7 is for example 2 m/sec.

In the above annealing method, however, sections other than the grooves 2a are also irradiated by the laser spot, which leads to a narrower effective recording track and causes the signal level to drop. For this reason, the laser spot irradiated on the recording layer 4 must be made smaller, but because the first dielectric layer 3 is optimized to the wavelength of the recording/reproducing laser light, it has been difficult to reduce the size of the laser spot of the annealing laser light 7. That is to say, attempting to maintain the effective track width while also securing the annealing width meant that the track pitch could not be made smaller and higher densities could not be achieved.

For the same reason, since it was difficult to increase the absorption efficiency of the recording layer 4 with respect to the annealing laser light 7, there was the problem that the annealing could not be performed at high linear speeds, so that the annealing was time-consuming. Moreover, fluctuations in the annealing power lead to variations in the annealing width, thereby causing variations in the effective track width and making it difficult to obtain good recording/reproducing properties. Furthermore, the annealing power at which an annealing of a specific width can be achieved varies disk by disk or varies with the radial position of the optical disk depending on the process, so that the track pitch must be determined with consideration to these variations, which stands in the way of higher densities.

SUMMARY OF THE INVENTION

To solve these problems of the related art, it is an object of the present invention to provide an optical disk that has a high recording density and with which annealing can be performed in a short time, and also with which a small, precise annealing width can be achieved, as well as a manufacturing method for such an optical disk.

To achieve this object, the optical disk of the present invention includes at least a first dielectric layer, a magnetic layer, and a second dielectric layer on a disk-shaped substrate in which pits and grooves have been embossed; wherein a data region used for recording/reproducing data comprises a plurality of tracks from an innermost track to an outermost track, each of the tracks comprising a plurality of segments, and each of the segments comprising a pit region and a groove region; wherein the pit regions have at least a pair of sample servo wobble pits and an address pit for the track address, and tracks provided in the data region for recording/reproducing data are made of grooves; wherein tracks are magnetically separated from one another by scanning a focused light beam over lands between tracks at a predetermined power and annealing to lower the magnetic anisotropy of the magnetic layer; and wherein the optical disk comprises a power testing region comprising one or more tracks for finding the predetermined annealing power at the location of at least one of the group consisting of a specific region within the data region, a region more to the inner side than the innermost track of the data region, and a region more to the outer side than the outermost track of the data region.

In accordance with the present invention, a first method for manufacturing an optical disk that comprises at least a first dielectric layer, a magnetic layer, and a second dielectric layer on a disk-shaped substrate in which pits and grooves have been embossed, wherein a data region used for recording/reproducing data comprises a plurality of tracks from an innermost track to an outermost track, each of the tracks comprising a plurality of segments, and each of the segments comprising a pit region and a groove region, wherein the pit regions have at least a pair of sample servo wobble pits and an address pit for the track address, and tracks provided in the data region for recording/reproducing data are made of grooves; wherein tracks are magnetically separated from one another by scanning a focused light beam over lands between tracks at a predetermined power and annealing to lower the magnetic anisotropy of the magnetic layer, and wherein the optical disk comprises a power testing region comprising one or more tracks for finding the predetermined annealing power at the location of at least one of the group consisting of a specific region within the data region, a region more to the inner side than the innermost track of the data region, and a region more to the outer side than the outermost track of the data region, includes:

(1) a step in which a light beam is irradiated on the lands at a reproducing power that does not cause a reversible change with respect to the optical disk, is focused and subjected to tracking, and one of the power testing regions is chosen and at least one of the segments in the selected power testing region are taken as unit annealing regions, and light beams of annealing power for testing of different values larger than the value of the reproducing power are irradiated at each of the plurality of unit annealing regions;

(2) a step in which the predetermined annealing power appropriate for annealing is found from the difference in reflectance of the plurality of unit annealing regions created in step (1) and the reflectance of the unit annealing regions that are not irradiated by the light beams of annealing power for testing, by scanning at the reproducing power; and (3) a step in which at least the land portions to both sides of the tracks within the data region are scanned and annealed at the predetermined annealing power found in step (2).

In accordance with the present invention, a second method for manufacturing an optical disk that includes at least a first dielectric layer, a magnetic layer, and a second dielectric layer on a disk-shaped substrate in which pits and grooves have been embossed, wherein a data region used for recording/reproducing data comprises a plurality of tracks from an innermost track to an outermost track, each of the tracks is made of a plurality of segments, and each of the segments comprises a pit region and a groove region, and the pit regions have at least a pair of sample servo wobble pits and an address pit for the track address, and tracks provided in the data region for recording/reproducing data are made of grooves; is made of tracks magnetically separated from one another by scanning a focused light beam over lands between tracks at a predetermined power and annealing to lower the magnetic anisotropy of a magnetic layer on the lands; and is provided with a power testing region made by one or more tracks for finding the predetermined annealing power at the location of at least one of the group consisting of a specific region within the data region, a region more to the inner side than the innermost track of the data region, and a region more to the outer side than the outermost track of the data region, includes:

(1) a step in which a light beam is irradiated on the lands at a reproducing power that does not cause a reversible change with respect to the optical disk, is focused and subjected to tracking, one of the power testing regions is chosen and at least one of segments in the selected power testing region are taken as unit annealing regions, and a light beam of annealing power for testing, which is of a larger power than the value of the reproducing power and is of different values, is irradiated at each of the plurality of unit annealing regions;

(2) a step in which the predetermined annealing power appropriate for annealing is found from the difference in reflectance of the plurality of unit annealing regions created in step (1) and the reflectance of the unit annealing regions that are not irradiated by the light beam of annealing power for testing, by scanning at the reproducing power; and (3) a step in which a light beam of the predetermined annealing power found in step (2) is emitted, and while controlling the annealing power such that the ratio of the emission power to the reflection power from the disk becomes substantially constant, at least the land portions to both sides of the tracks within the data region are scanned and annealed.

DESCRIPTION OF THE PREFERRED EMBODIMENTS

Figure 1:
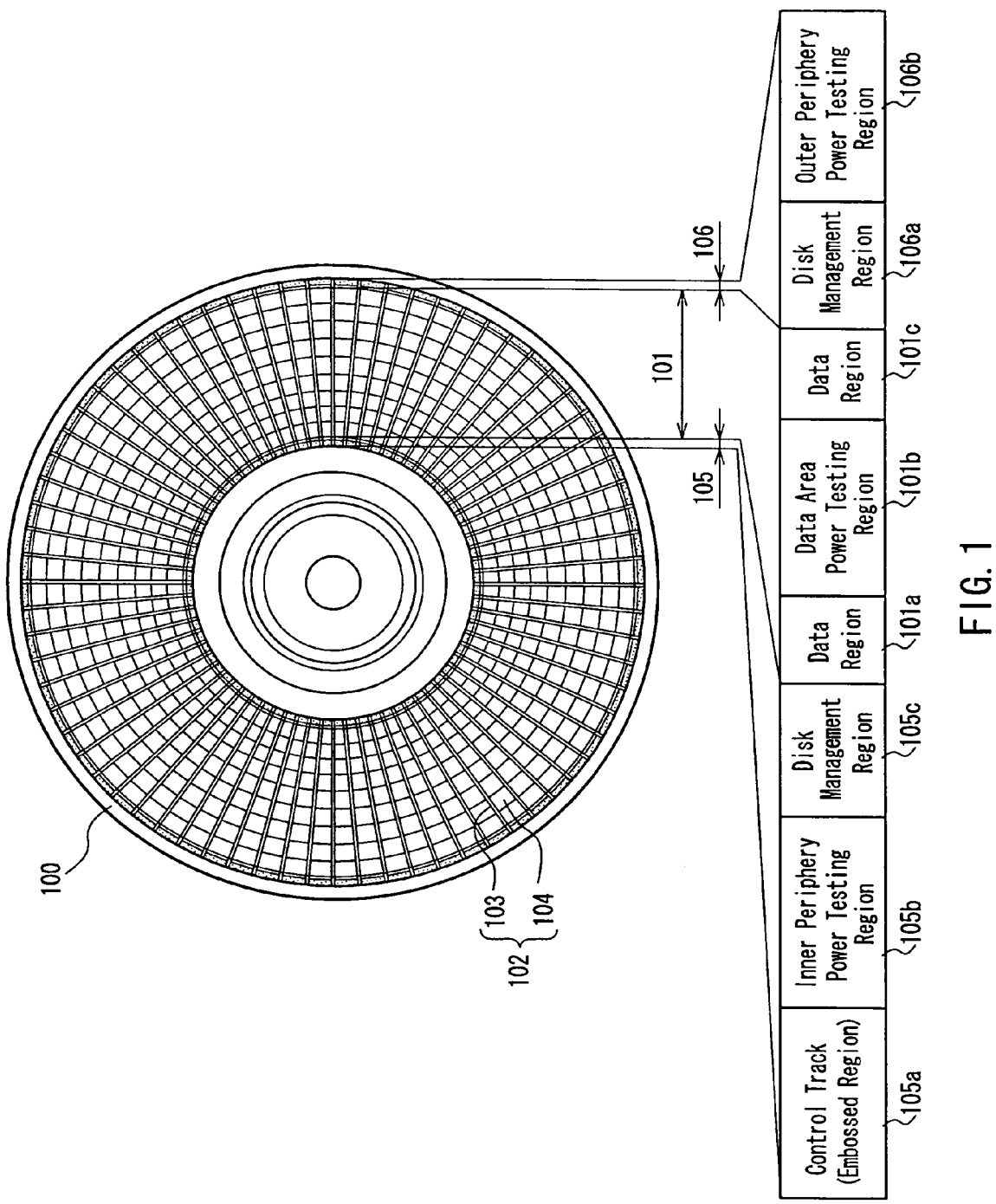
FIG. 1 is a diagram showing the overall configuration of an optical disk and the role of each of the tracks according to the first embodiment of the present invention.

With the optical disk of the present invention, annealing can be tested for each optical disk, so the optimal annealing power can be determined at the testing region, even if manufacturing conditions lead to variations among the optimal annealing power in the optical disks. It should be noted that annealing between tracks is an effective means for reducing reproduction crosstalk and increasing signal quality, whether the magnetic layer of the optical disk is made of an ordinary magneto-optical material or a magneto-optical material of a super-resolution format such as MSR (magnetically induced super resolution) or CAD (center aperture detection).

Additionally, it is preferable that the magnetic layer in the optical disk is of a configuration in which at least a domain wall displacement layer, a switching layer, and a recording layer are formed in that order, the switching layer has a Curie point that is lower than the Curie point of both the domain wall displacement layer and the recording layer, and in regions where the switching layer exceeds the Curie point due to the irradiation of the reproducing light beam, the domain wall that has been transferred into the domain wall displacement layer is shifted toward a high-temperature section. The magnetic layer of this preferable example corresponds to that of the DWDD disk shown in the conventional example. In DWDD, by magnetically separating the tracks, a higher linear density and narrower track pitches than in magneto-optical disks of other super-resolution formats can be achieved simultaneously. Naturally, when a high density is desired, then the width of the annealing that magnetically separates the tracks must be produced narrowly and precisely, so using power testing regions to find the optimal annealing power makes it possible to achieve higher densities.

In the above optical disk it is also preferable that by scanning over lands between tracks with a light beam that has been focused to be smaller than the light beam used for recording/reproducing, the magnetic anisotropy of the magnetic layer located at the lands or at the lands and the line of extension thereof is made lower than the magnetic anisotropy of the magnetic layer located at the grooves. According to this preferable example, the power density on the disk can be increased by making the optical beam smaller, which permits localized annealing and makes it possible to make the annealing width smaller. Also, increasing the energy density raises the usage efficiency of the light source, for example laser light, and the linear disk speed during the annealing can be increased, so the time of annealing the entire disk can be shortened. At the same time, a more narrow annealing width can be expected due to the heat dissipation effect resulting from increasing the linear speed.

Next, with the first manufacturing method of the present invention, a substantially optimal annealing power is found in advance for each optical disk to be annealed so that subsequent annealing can be carried out securely and with good precision.

Also, with this manufacturing method, it is preferable that in step (1), the unit annealing regions comprise a plurality of continuous segments, in which one or more segments irradiated with a light beam of annealing power for testing and one or more segments irradiated with only a light beam of reproducing power are arranged in alternation, and step (2) includes detecting very small changes in the reflectance alternately, even if there are reflectance variations in the revolving direction, by continuously scanning the unit annealing regions at the reproducing power. In this preferable example, the difference in reflectance between annealed and non-annealed regions of local portions with a substantially uniform reflectance can be detected, even if there are reflectance variations in the revolving direction of the optical disk. Moreover, the annealed regions and non-annealed regions are detected alternately and with a single scan, so that the detection can be performed efficiently.

Also, in the above manufacturing method, it is preferable that a plurality of power testing regions are chosen, the optimal annealing power for each power testing region is determined by carrying out the steps (1) and (2), the optimal annealing power considered appropriate for each disk radial position is calculated from the relationship between the radial position of the plurality of power testing regions and the optimal annealing power, and the optimal annealing power in accordance with the radial position of the lands to be annealed is used in step (3). According to this preferable example, an approximate optimal annealing power can be determined even for optical disks in which the optimal annealing power is different depending on the radial position, so subsequent annealing can be carried out more securely and precisely.

According to a second manufacturing method of the present invention, taking the substantially optimal annealing power found in advance at the power testing regions as a standard, the power of the return light during annealing is measured in real time, while during appropriate annealing the annealing power can be controlled such that the ratio of the return light amount to the annealing power is a specific value during irradiation at the appropriate annealing power, so that a substantially optimal annealing can be performed in real time at any region of the optical disk.

Also, in this manufacturing method, it is preferable that step (3) comprises irradiating the light beam of the predetermined annealing power onto pit regions in addition to the land portions, and controlling the predetermined annealing power such that there is a constant ratio between the reflection power at a mirror portion that is within the pit regions and is not affected by the pits and the emission power of the predetermined annealing power. With this preferable example, even if there are variations in the amount of the light reflected back from the land portion due to the shape of the lands, that is, land depth, width, or angle of slope, for example, a constant reflectance revealing the state of the anneal can be obtained at the mirror portion regardless of the shape of the lands, so a more stable and highly precise annealing can be implemented.

It is preferable that this manufacturing method includes, before step (3), irradiating a light beam of the predetermined annealing power onto unused segments or tracks that have not been irradiated with a light beam of annealing power, and determining in advance a substantially optimal value for the ratio between the irradiation power and the reflection power, and in step (3) controlling the annealing power such that the ratio between the irradiation power and the reflection power becomes the substantially optimal value. According to this preferable example, even if there is a different ratio of irradiation power to reflection power during the optimal annealing power due to the structure or the production method of the disk, the optimal ratio for each disk to be annealed can be measured and calculated in advance at the power testing regions, and the annealing power can be controlled such that the ratio becomes the optimal ratio during subsequent annealing, and thus the annealing precision can be increased further.

Thus, according to the optical disk and manufacturing method thereof of the present invention, in a magneto-optical disk of the DWDD reproduction format with sample servo format tracking and groove recording, power testing regions are provided at regions that do not reduce capacity, and there the appropriate value for the annealing power accurately can be tested and calculated in advance, so the annealing width of the annealing process during the manufacture of the optical disk can be accurately and implemented precisely. With the annealing device (method), the scanning speed of the annealing can be increased by irradiating from the layered thin film surface, which is not affected by birefringence or tilt, a high energy density annealing beam that has been focused more narrowly than the recording/reproducing beam, formed by a short-wavelength high-output laser light source with a high NA objective lens. Thus, an optical disk of a high recording density and high reliability with respect to recording and reproducing data can be obtained in a short time and at low cost. Also, even if there are variations in the appropriate annealing power between optical disk lots, in the circumferential direction, or in the radial direction, an accurate annealing power for the location to be annealed can be predicted by reflectance testing at a plurality of power testing regions. Furthermore, in addition to predicting the power, annealing can be implemented while the reflectance during annealing is monitored in order to maintain the annealing power at the true appropriate value, so if power testing according to the present invention is performed, the width of the annealed regions between the recording tracks can be made smaller and the width of the annealed regions can be made more uniform. Thus, with the optical disk of the present invention, an inexpensive optical disk is obtained that has a high recording density, a large signal level, and low noise.

More specific examples of the present invention will be described below with reference to the drawings.

First Embodiment

In the first embodiment, an example of the optical disk of the present invention will be described.

FIG. 1 is a diagram showing the overall configuration and the role of each of the tracks of an optical disk 100 according to the first embodiment. In FIG. 1, the optical disk 100 is a sample servo format magneto-optical disk, and numeral 101 denotes a data region for recording/reproducing user data, made of a plurality of tracks. Each track is made of a plurality of segments 102. There are, for example, 1280 separate segments 102 per track, and each track is made of the number of segments sufficient for the tracking servo. The segments 102 are made of a pit region 103 for recording the sample servo signal and the address signal, and a groove region 104 for recording/reproducing data. A lead-in region 105 and a lead-out region 106 are located at the inner periphery and the outer periphery, respectively, of the optical disk. Except for the groove region of a control track 105a, which is explained below, these are made of segments 102, just like the data region 101.

The layout of the tracks is shown at the bottom of FIG. 1. As shown, the lead-in region 105 is made up of three regions. In order from the inner periphery, these are the control track 105a, on which, for example, information pertaining to the use of the disk has been stored in advance, an inner periphery power testing-region 105b for testing the annealing power (corresponds to learning the power level of ordinary data), and a disk management region 105c for recording the alternate management information DMA, for example. A portion of the grooves of the groove region 104 within the segments 102 of the control track 105a is made up of prepits (also called "embosses"). The data region 101 is made up of three regions, namely a data region 101a, a data area power testing region 101b for testing the annealing power, and a data region 101c. The lead-out region 106 is made up of a disk management region 106a and an outer periphery power testing region 106b for testing the annealing power.

Figure 2A:
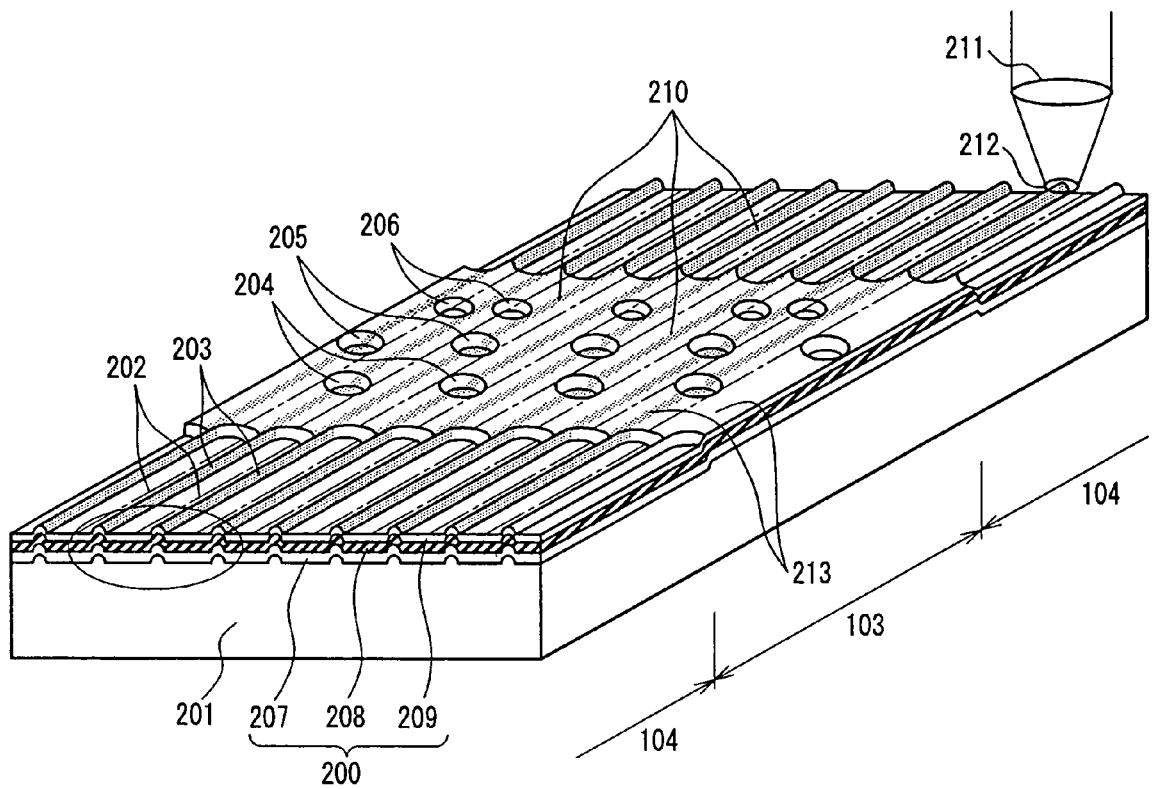
FIG. 2A is a cross-sectional perspective view of the optical disk according to the first embodiment of the present invention.
Figure 2B:
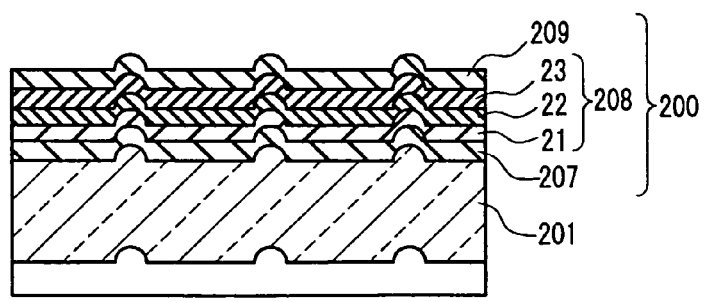
FIG. 2B is a magnified view of the layered thin film of the same.

FIGS. 2A and 2B illustrate the structure of the optical disk 100 when it is of the DWDD reproduction format, and are a perspective view (FIG. 2A) showing a partial cross-section of the data region 101 and a magnified view (FIG. 2B) of the cross-section. In FIG. 2A, numeral 201 denotes the substrate of the optical disk 100. The substrate 201 is formed by a process of injection molding polycarbonate, for example, and is about 0.4 mm to 1.2 mm thick, for example. Numerals 202 and 203 denote the grooves and lands, respectively, of the groove region 104. Numerals 204, 205, 206, and 213 are a first wobble pit, a second wobble pit, an address pit, and a mirror portion, respectively, making up the pit region 103. A first dielectric layer 207, a magnetic layer 208, and a second dielectric layer 209 are layered on the substrate in that order, and together form a layered thin film 200. For the first and second dielectric layers 207 and 209 it is possible to use a transparent dielectric material such as $Si_3N_4$, AlN, $SiO_2$, SiO, ZnS, $MgF_2$, or a composite material thereof.

Numeral 210 denotes a magnetic coupling blocking region for separating the tracks of the optical disk 100 to prevent adjacent tracks from negatively affecting one another during DWDD reproduction. An annealing device is used to form the magnetic coupling blocking region 210 during the process of manufacturing the optical disk 100. An objective lens 211, which is a part of that annealing device, focuses a laser beam into a high-power annealing light beam (light spot) 212 and irradiates it onto the layered thin film 200 on the lands 203 and extensions of the lands to deteriorate their magnetic properties, thus forming the magnetic coupling blocking regions 210. When actually manufacturing the disks, for each optical disk both sides of all tracks for normal recording/reproducing, including the data region 101, have to be annealed. More specifically, annealing can be achieved by scanning the lands of regions to be annealed at a predetermined annealing power while applying tracking. Here, to lower manufacturing costs, there is a need for the annealing to be achieved at the fastest scanning speed and in the shortest time possible.

To narrow the track pitch and achieve higher densities, the smaller the width of the magnetic coupling blocking region 210 the better. One reason why the width should be small is because then, the energy density of the annealing light beam 212 can be raised to locally deteriorate the layered thin film 200, while at the same power, the scanning speed, that is, the linear speed, can be increased. Another reason is that tracking is applied by detecting the push-pull signals from the land of tracks of a smaller track pitch. To make the diameter of the annealing light beam 212 as small as possible, here a laser light source with a short wavelength $\lambda$ of about 400 nm, such as a GaN semiconductor laser element or a SHG element that halves the wavelength of a red laser, is used and the NA of the objective lens is made larger than normal at 0.65 to 0.85 to narrow down the annealing light beam, which is determined by $\lambda/NA$, into a small beam.

If a short wavelength and an objective lens with high NA are used, then, when laser light is made incident from the ordinary recording/reproducing substrate 201, that is, from below in FIGS. 2A and 2B, to form a light beam on the layered thin film 200, there is a considerable deterioration in the focusing capability of the light beam compared to that of a normal light beam with respect to the tilt of the substrate, and therefore this method cannot be said to be preferable. Also, it is difficult to make the wavelength of the laser light source small and to make the NA of the objective high when a stable light beam is to be formed on the other side of the substrate 201. Accordingly, in the annealing process here, the laser light is made incident from the layered thin film 200 side. This eliminates the effect of substrate tilt, and thus by making the wavelength of the laser light source small and the NA of the high optical lens high, it is possible to form a small, favorable annealing light beam on the layered thin film 200. For example, an annealing light beam 212 of $\lambda=405$ nm and NA=0.85 makes it possible to achieve a light beam that is approximately 0.44 times smaller than a light beam with wavelength $\lambda=650$ nm and NA=0.6 as typically used in recording/reproduction. It should be noted that looking at the disk from the layered thin film 200 surface side, the lands 203 are seen in front, so care must be given to tracking polarity because the lands 203 look like normal reproduction grooves.

The lands 203, in addition to having the effect of thermally separating the tracks, principally have been disposed for achieving the annealing. In addition to the lands 203, the first wobble pits 204 and the second wobble pits 205 are provided for the purpose of ordinary recording/reproducing. The sample servo is applied to let each of the wobble signals have the same size, so that the reproducing light beam can scan the center of the grooves 202. The positions of the wobble pits have been arranged such that the pits are positioned alternately at even and odd tracks, so that tracking is possible even if the recording/reproducing beam has twice the diameter of the annealing light beam 212.

Figure 4:
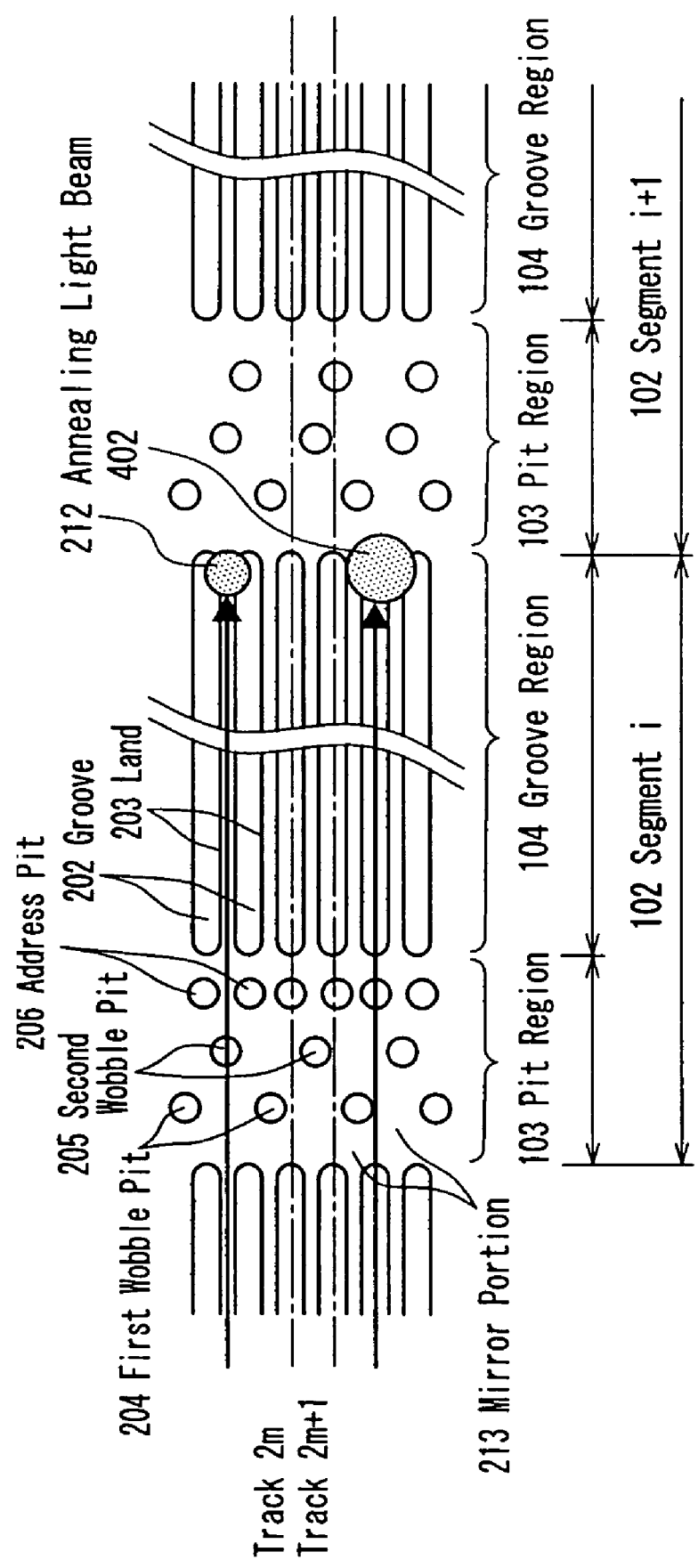
FIG. 4 is a plan view showing a magnification of the relationship between the optical disk and the light beams used for annealing and recording/reproducing according to the first embodiment of the present invention.

FIG. 4 shows a plan view of the optical disk 100 seen from the layered thin film 200 side. The annealing light beam 212 is irradiated on the layered thin film 200 from the front when viewed from the paper plane and anneals by scanning the lands 203 and the linear extensions thereof. The spot diameter of the annealing light beam 212 is smaller than the track pitch. Numeral 402 denotes the recording/reproducing light beam, which is transmitted through the substrate 201 from the rear when seen from the paper plane and scans the grooves 202 of the layered thin film 200 and the linear extension on those grooves to record and reproduce data. It has a spot diameter that is larger than the track pitch.

The address pits 206 either share a common position for odd and even numbered tracks (referred to as "common address"), as is the case in the i-th segment 102, or the address pits 206 are positioned independently at odd (2 m+1) or even (2 m) track numbers, that is, at even numbered tracks or odd numbered tracks only (referred to as "independent address"). In this example, the (i+1)-th segment 102 shows a case in which the address pits 206 are arranged only at the odd tracks 2 m+1. To read the address during annealing, the annealing light beam 212 does not scan over the address pits 206, but common addresses are read out from the address pits 206 removed ½ track on either side, and independent addresses are read out from the address pit 206 removed ½ track on either the even or the odd track. When reading out independent addresses, other independent address pits 206 are 1.5 tracks removed, so regarding the fact that the annealing light beam 212 is small, there is no interference.

It should be noted that during the annealing process, to stabilize the tracking when disturbance from the pit regions causes disturbance in the push-pull signals, it is of course possible to stabilize the tracking using, as known in the art, sample-and-hold or a low pass filter, but in the present invention there is essentially a single address pit 206 in the pit region 103 and addresses can be read by calculation, depending on in which pit regions 103 there are address pits 206, so the length of the pit regions 103 is set shorter than that of the groove regions 104 and to a length at which servo disturbance does not easily occur. This means that to gain a larger recording capacity, the length of the pit regions 103 has been made shorter than the groove regions 104 by making the groove regions 104 as long as possible.

The annealing light beam 212 was described above, and the annealing power when the annealing actually is performed will be described next. Providing the optical disk 100 with as high a density as possible is an important topic for practical application. To achieve this, the width of the annealing, which does not contribute to recording and reproducing, should be made very small, so that the track pitch, which is determined by the recording/reproducing width and the annealing width and which should be of a constant width, can be made as narrow as possible. To this end, the annealing power should be reduced as much as possible. On the other hand, making the annealing power too small leaves one of the original objects, namely that of magnetic coupling blocking, incomplete. Consequently, it is desirable to make the annealing power as large as possible, meaning that to balance the above conditions, the annealing must be carried out at an appropriate level of power that is neither too large nor too small. There is also the possibility that the appropriate annealing power value varies with respect to variations in the annealing characteristics of the recording layer occurring at each disk, variations in the radial direction, and variations in the circumferential direction due to the method for producing the optical disks. Therefore, annealing should be carried out at the ideal power, even if there are fluctuations in the appropriate value.

For this reason, it is preferable that power testing is performed, as has been performed conventionally. The ordinary conventional approach to power testing has been to test write a value with a power level above and below a power considered an appropriate value, after which the recorded track is reproduced and certain characteristics are measured. Here, however, when the annealing power exceeds the appropriate value, the annealing width becomes too big, and subsequently may render the annealed tracks unusable as recording/reproducing tracks. In other words, the test is destructive. Thus, there are significant problems with test writing in normal data regions at greater than appropriate power levels.

One conceivable solution is to reproduce a track immediately after it has been annealed at a low power, then sequentially raise the power and when the reflectance begins to change, to search for the optimal power. A drawback to this method is that it is time-consuming, but since it is a non-destructive test, it can be said to be a practical technique. Destructive testing cannot be avoided, however, if greater efficiencies are to be achieved. Accordingly, in this invention since the annealing is carried out from the layered thin film 200 side and since the optical disk is a magneto-optical disk, particularly the inner periphery power testing region 105b and the outer periphery power testing region 106b have been arranged separately from the data region 101.

These regions have a large birefringence, and in normal recording/reproducing they are not preferable in terms of their magneto-optical recording/reproducing properties. Because the annealing process is not carried out via the substrate 201, the tilt has little adverse influence and also the birefringence has substantially no impact, and thus these regions are sufficiently useable for testing the annealing. This is the basis for devising the arrangement of the power testing region. Particularly in the outer periphery region, which in ordinary optical disks is a region of about 1 to 3 mm that is unusable for recording/reproducing, a large number of about several hundred tracks can be allocated for annealing power testing. To raise the recording capacity to the highest possible level, the testing regions of the inner periphery and the data region can be omitted and the outer periphery, which does not reduce the capacity, can be taken as the power testing region.

The separately provided data area power testing region 101b of the data region 101 is provided preferably for the purpose of conducting the aforementioned non-destructive test. For this reason, the testing time can be shortened by finding the appropriate annealing power in the outer periphery power testing region and then performing the non-destructive test at a power slightly below this power. The data area power testing region 101b has been given as a single region, but it is also possible to allocate a plurality of regions in the data region 101 for this region, and although this leads to a slight drop in recording capacity, it is also possible to determine a portion as a destructive testing region and exclude it from the user region. Also, although not shown in the drawings, the disk testing region or the drive testing region, for example, which are established in the inner or outer peripheries of an ordinary optical disk, may be allocated as a portion of the inner periphery power testing region 105b or the outer periphery power testing region 106b, or as a portion of the disk management regions 105c and 106a. In this case, the disk testing region and the drive testing region would require ordinary recording/reproducing properties, so that both sides of the tracks given for testing the drive and the disk should be annealed at an appropriate annealing power. Consequently, when the disk testing region or the drive testing region is set in the inner periphery power testing region 105b and the outer periphery power testing region 106b, areas that are not affected by birefringence are allocated at the tracks on the data region side, if possible.

Next, the configuration of the magnetic layer 208 will be described using FIG. 2B, and the DWDD operation will be described and its relationship to the annealing will be made clear using FIGS. 3A to 3D. In FIG. 2B, the numerals 21, 22, and 23 are a domain wall displacement layer, a switching layer, and a recording layer, respectively, and are formed on the first dielectric layer 207 as the magnetic layer 208.

The thickness of the second dielectric layer 209 is set such that when laser light for annealing is irradiated from the second dielectric layer 209 side, its reflectance is low and light is absorbed efficiently. More specifically, the thickness of the second dielectric layer 209 is at least $\lambda/(12 \times n)$ and not higher than $\lambda/(2 \times n)$(preferably at least $\lambda/(6 \times n)$ and not higher than $\lambda/(2 \times n)$), and preferably is about $\lambda/(4 \times n)$.

The magnetic layer 208 includes three or more magnetic layers to permit reproduction by DWDD. The magnetic layer 208 is annealed using the light of a wavelength $\lambda$ incident from the second dielectric layer 209 side. In one example of the magnetic layer 208, if it includes the domain wall displacement layer 21, the switching layer 22, and the recording layer 23 layered in that order from the substrate 201 side, then the following materials can be used for these layers. For the domain wall displacement layer 21, a material can be used that has a small domain wall coercivity and a small saturation magnetization in the temperature range near the Curie temperature of the switching layer 22, and has a Curie temperature that is below that of the recording layer 23 and higher than that of the switching layer 22. For example, GdCo, GdFeCo, or an alloy thereof with a Curie temperature about 220° to 260° C. can be used.

The material used for the switching layer 22 preferably has a Curie temperature below that of both the domain wall displacement layer 21 and the recording layer 23, and has a large domain wall coercivity until immediately below its Curie temperature. For example, it is possible to use DyFe or TbFe, or an alloy thereof, with a representative Curie temperature of 140° to 180° C.

For the recording layer 23, a material can be used that has a large domain wall coercivity, a Curie temperature larger than that of the domain wall displacement layer 21 and the switching layer 22, and a small saturation magnetization at a temperature range near the Curie temperature of the switching layer 22. For example, it is possible to use TbFeCo or an alloy thereof with a Curie temperature between 280° and 300° C.

Referring to FIGS. 3A to 3D, the following is a description of the functions of an optical disk in which the magnetic layer 208 includes the domain wall displacement layer 21, the switching layer 22, and the recording layer 23 layered in that order from the substrate 201 side.

Figure 3A:
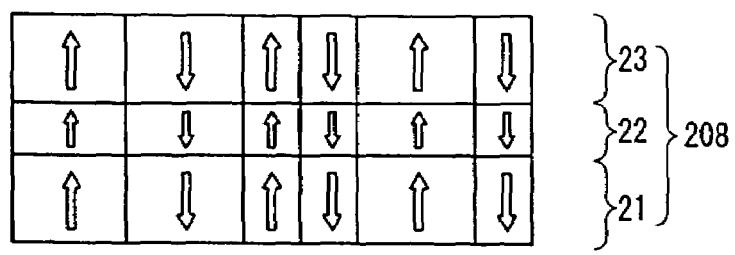
FIGS. 3A to 3D are schematic views illustrating the reproducing operation of the optical disk according to the first embodiment of the present invention.

FIG. 3A schematically shows the state of the magnetic layer 208 when the reproducing laser light is not irradiated. The information signal is recorded in the recording layer 23 as magnetic information. When the reproducing laser light is not irradiated, the magnetic information of the recording layer 23 is transferred to the switching layer 22 and the domain wall displacement layer 21, because the domain wall displacement layer 21, the switching layer 22, and the recording layer 23 are exchange coupled.

Figure 3B:
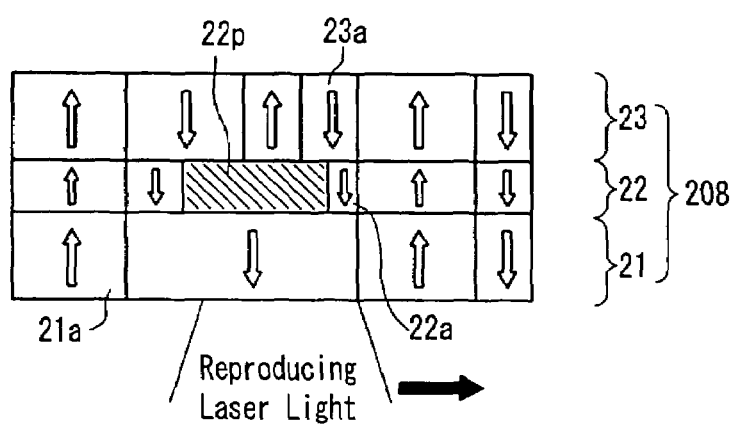

The state of the magnetic layer 208 when the reproducing laser light is irradiated is shown schematically in FIG. 3B. The reproducing laser light moves relative to the optical disk in the direction of the black arrow. The irradiation of the reproducing laser light increases the temperature of the layers and generates a section 22p, where the temperature is greater than the Curie temperature, in a portion of the switching layer 22 (represented by the slanted lines in the drawing). The section 22p blocks the exchange coupling between the domain wall displacement layer 21 and the recording layer 23. When this happens, the domain wall of the domain wall displacement layer 21 shifts due to the gradient in domain wall energy density, which is dependent on the temperature. For this reason, there is an expanded magnetic domain 21a in the domain wall displacement layer 21 adjacent to the section 22p. Then, the information of a magnetic domain 23a of the recording layer 23 is transferred to the expanded magnetic domain 21a via a magnetic domain 22a positioned in front of the section 22p (here, "front" means in the direction of movement of the reproducing laser light relative to the substrate 201; i.e. the direction of the arrow in FIG. 3B).

Figure 3C:
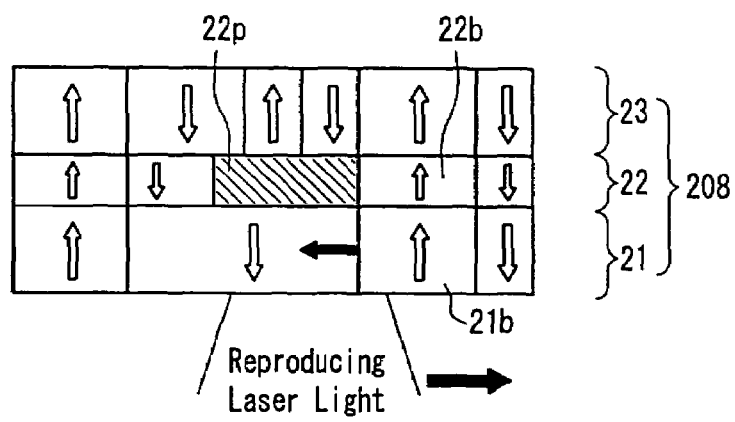
Figure 3D:
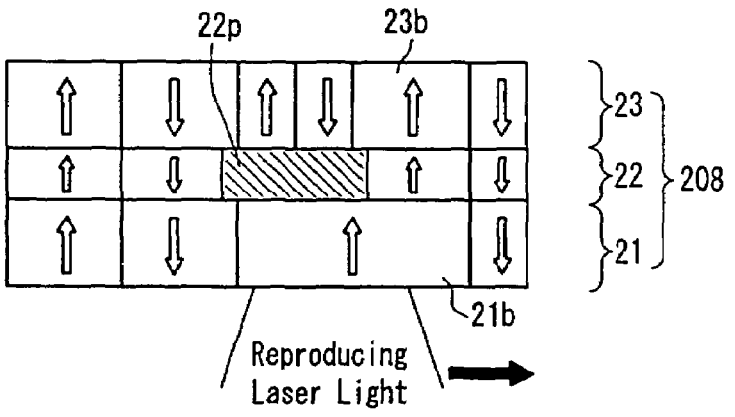

As shown in FIG. 3C, when the reproducing laser light moves forward (to the right in the drawing) from the state shown in FIG. 3B, the temperature of the magnetic domain 22a increases and it becomes part of the section 22p. At this time, the domain wall on the left side of the magnetic domain 21b, which is adjacent to the magnetic domain 22b and positioned in front of the section 22p, shifts to the left (small black arrow in FIG. 3C). The expanded magnetic domain 21 is then formed, as shown in FIG. 3D, and the information of the magnetic domain 23b is transferred to the expanded magnetic domain 21b via the switching layer 22.

Thus, in DWDD format, the information recorded in the recording layer 23 is expanded and transferred to the domain wall displacement layer 21. Consequently, the DWDD format is one of the so-called super-resolution formats in which the information of a magnetic domain smaller than the spot diameter of the reproducing laser light can be reproduced. In the DWDD format, the magnetic coupling between adjacent tracks considerably obstructs the displacement of the domain wall, but the effects of this are blocked by the magnetic coupling blocking region 210, which is made by annealing, to prevent this. This means that by annealing, the optical disk 100 is able to exhibit the high linear density properties of the DWDD format, which enables high density recording beyond the reproduction and resolution capabilities of the spot diameter. It should be noted that the recording to such miniscule magnetic domains can be performed by laser pulse magnetic field modulation recording, for example.

As mentioned above, with the optical disk 100 of the first embodiment, the power testing region can be used to find the appropriate annealing power and at this power level the anneal can be performed in a short time. Thus, an optical disk with a high recording density and highly reliable recording/reproducing properties can be obtained.

The optical disk of the present invention was given as a DWDD optical disk, but it is known that, in general, magneto-optical disks can have improved signal recording/reproducing properties, such as cross talk and overwriting properties, by magnetically blocking the tracks by annealing, so that the establishment of an annealing power testing region is beneficial for any magneto-optical disk. Although the power testing region was given as a plurality of regions, it also can be a single region, or a combined arrangement, as necessary. When ghosts in the DWDD properties become a problem, it is also possible to provide a control layer between the recording layer 23 and the switching layer 22 in the layered thin film 200. A heat conduction adjustment layer for adjusting the sensitivity of the magnetic layer 208 further can be provided on the layered thin film 200. For the heat conduction adjustment layer, a metal film can be used, and for example, a film made of aluminum or gold can be used. The thickness of the heat conduction adjustment layer is ordinarily about 50 to 500 nm.

After the layered thin film 200 has been formed, a protective coating layer and furthermore a lubrication layer, in which a lubricant is applied to improve the sliding properties of the magnetic head, can be provided on the dielectric layer 209 or the heat conduction adjustment layer. The protective coating layer can be formed using the same material as the substrate 201, or can be formed for example by applying and curing an UV curable resin or laminating the substrate on the second dielectric layer 209. The protective coat layering also can be a layer that has been provided with the slide improving function of the lubrication layer.

The annealing process for the optical disk of the present invention was performed from above the second dielectric layer 209, but it also can be performed after layering the heat conduction adjustment layer, the protective coating layer, and the lubrication layer. However, if a heat conduction adjustment layer is inserted, then it is preferable that it is made thin enough that light is absorbed, so that the light beam is not reflected, thus causing a drop in the effective annealing power. Also, it is preferable that the thickness of these further layered layers, in particular the thickness of the protective coating layer applied by spin coating, for example, is such that variations are suppressed to a predetermined level, and spherical aberration in the objective lens of the annealing device is corrected.

In the annealing of optical disks according to the present invention, entire segments, that is, both the groove region 104 and the pit region 103, are annealed. However, it also possible to anneal only the groove regions 104, which contribute to the recording/reproducing of data, or to anneal all groove regions and only a portion of the pit regions.

It is also possible to use the pit regions 103, which do not have a role in the recording and reproducing of data, for the power testing regions of the annealing of the optical disk according to the present invention. However, here the reflectance in the middle of the first wobble pit 204 and the second wobble pit 205 may change as the annealing power is learned, so the power testing regions should be selected such that the balance of the sample servo is not lost.

The present invention was described with the groove region in the segment having grooves, but this region also can be any configuration with land portions, plate portions, or land and groove portions. With plate portions or lands and grooves, for the tracking during annealing, pit portions for tracking can be provided for the pit portions, or tracking can be carried out by a guiding light beam provided separately from the annealing light beam, using the pit regions used for normal reproduction.

Furthermore, the present invention has been explained for the sample servo format, but the region for testing the annealing power is not limited to this format, and it can be adopted easily to other optical disk formats requiring annealing or equivalent treatment, such as the continuous composite servo format.

Second Embodiment

In a second embodiment, an example of the manufacturing method for the optical disk of the present invention will be described. The manufacturing method of the second embodiment is for an optical disk that reproduces information signals by DWDD using light incident from the substrate side. In the following description, an optical disk 100 as described in the first embodiment is manufactured. Elements that are similar to elements described in the previous embodiment are given identical numerals and redundant descriptions thereof have been omitted (as is the case in the following embodiments).

In the manufacturing method of the second embodiment, first the first dielectric layer 207, the magnetic layer 208, and the second dielectric layer 209 are formed on the substrate 201 in that order (hereinafter, this step also is referred to as the "film formation step"). These layers can be formed successively by, for example, vapor deposition or sputtering with a magnetron sputtering device. In particular, the plurality of magnetic layers constituting the magnetic layer 208 can be made to maintain magnetic exchange coupling by successively forming these films without breaking the vacuum. Layers other than those mentioned above can be formed between the substrate 201 and the second dielectric layer 209.

After the film formation process, an annealing for weakening the magnetic coupling of a portion of the magnetic layer 208 is performed by irradiating an annealing laser of a wavelength $\lambda$ from the second dielectric layer 209 side onto the magnetic layer 208. This annealing step will be explained later.

Between the film formation step and the annealing step, it is possible to include a step of forming a protective coat layer on the second dielectric layer 209. The protective coat layer also can be formed after the annealing step. Furthermore, it is also possible to further include, after the annealing step, a step of forming the heat conduction adjustment layer described in the first embodiment on the second dielectric layer 209. The heat conduction adjustment layer can be formed by sputtering or vapor deposition. In this case, the protective coating layer is formed after the heat conduction adjustment layer has been formed.

An example of the annealing step of the optical disk 100 is described below. It should be noted that in the following description, the optical disk 100 that is annealed uses a substrate 201 made of polycarbonate with a refractive index of 1.58, a first dielectric layer 207 (70 nm thickness) made of $Si_3N_4$, and a second dielectric layer 209 (130 nm thickness) made of $Si_3N_4$. Similarly, in the following description, the magnetic layer 208 of the optical disk 100 includes, as shown in FIG. 2, a domain wall displacement layer 21, a switching layer 22 and a recording layer 23, layered in that order from the substrate 201 side. Here the domain wall displacement layer 21 is a GdCo layer (30 nm thickness), the switching layer 22 is a DyFe layer (10 nm thickness), and the recording layer 23 is a TbFeCo layer (40 nm thickness).

Figure 5:
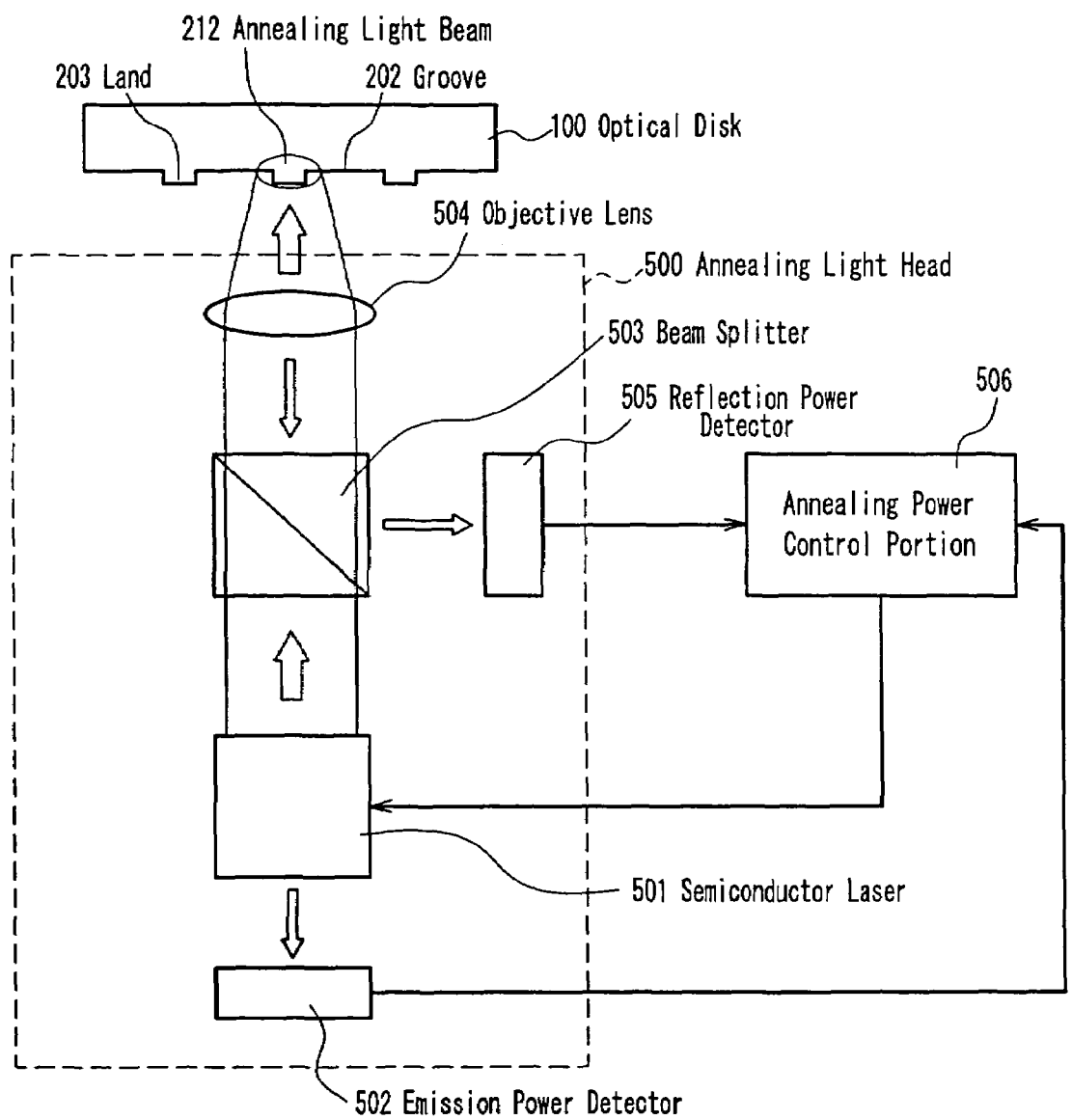
FIG. 5 is a structural diagram illustrating the relationship between the main elements of the annealing light head and the optical disk to be annealed, used in the methods for manufacturing the optical disk according to the second to fifth embodiments of the present invention.

FIG. 5 is an example of the annealing device according to the manufacturing method of the optical disk of the second embodiment, and illustrates the main structural components of this annealing device. The annealing device is configured of structural components that are substantially the same as in ordinary optical disk devices, and has the functions of disk motor control, focus control, tracking control, address reading, and seek control, for example. These components known in the art have been omitted from the drawings and also the description of their operation has been omitted. The following description centers on power testing in the annealing step, which is a main aspect of the present invention.

In FIG. 5, the optical disk 100 to be annealed is shown in a cross-section perpendicular to the tracks when the grooves 104 are being scanned. The annealing beam 212 is focused from the annealing light head 500 onto the center of the land 203, and is irradiated on the optical disk 100 while applying tracking control. For detecting the tracking error signal, a regular push-pull format is adopted. As mentioned earlier, when viewed from the layered thin film 200 side, the lands 203 polarity can be observed as that of groove.

Numeral 501 denotes a GaN semiconductor laser with $\lambda=405$ nm, 502 denotes an irradiation power detector for measuring a portion of the light emitted from the semiconductor laser 501 as the irradiation power, 503 denotes a beam splitter, and 504 denotes an objective lens with a high NA of 0.85. The laser light emitted from the semiconductor laser 501 is transmitted through the beam splitter 503 and the objective lens 504, and focused on the land 203 of the optical disk 100, forming the annealing light beam 212. The annealing light beam 212 is absorbed by the layered thin film 200 of the optical disk 100 and converted into heat, and also is reflected and returns to the annealing light head 500 as reflected light. A quarter wavelength plate not shown in the drawing is placed between the objective lens 504 and the beam splitter 503, and the reflected light has its optical path altered at the beam splitter 503 and is guided into a reflection power detector 505. The emission power of the semiconductor laser 501 is controlled by an annealing power control portion 506 in accordance with the results of the detections made by the irradiation power detector 502 and the reflection power detector 505.

In the annealing process, first the optical disk 100 is rotated by a disk motor not shown in the drawings, and the semiconductor laser 501 emits light at a reproduction power level, which is below the annealing power level, focus and tracking are applied, the address is read, and the annealing light beam 212 is first guided to the outer periphery power testing region 106b, where the annealing power test, which is described later, is carried out, to find a suitable first annealing power. Similarly, the annealing light beam 212 is guided onto the data area power testing region 101b and the inner periphery power testing region 105b, to perform the annealing power test described below, thus finding a second annealing power and a third annealing power, respectively.

From the first, second, and third annealing power levels found as described above, the optimal value for the annealing power at the track to be annealed is estimated and determined through an interpolation process. Following that, the annealing light beam 212 is guided onto the inner periphery track to start, the emission power of the semiconductor laser 501 is turned from the reproducing power into the high power necessary to anneal that track optimally, and annealing is started. The optical disk is laid out as a spiral, so the annealing is continued while performing tracking without jumping. The annealing is continued while the settings for the optimal annealing power found above are changed successively in accordance with the annealing radius, the annealing is continued until the outer periphery track at which the annealing is to be stopped is reached, the power level of the semiconductor laser 501 is returned to that of the reproducing power, and the annealing process is finished. Then, the tracking and focus are turned off, emission from the semiconductor laser 501 is stopped, the disk motor is stopped, and the disk is removed from the annealing device, thus completing the annealing process.

Because all tracks have to be scanned, from several minutes to close to one hour is required for the annealing step, although this depends on the diameter of the optical disk, the track pitch, and the number of revolutions, making a reduction in time important in practice. Accordingly, there is a demand for forming a high-power, small light beam and annealing at high linear speeds. With the present annealing device, the annealing light beam 212 is a short wavelength laser and can be narrowly focused by the high NA objective lens, and thus is suitable for annealing. Additionally, because the linear speed is increased, there is the added benefit that the annealing width does not readily fluctuate, even if there are fluctuations in the annealing power.

Figure 6A:
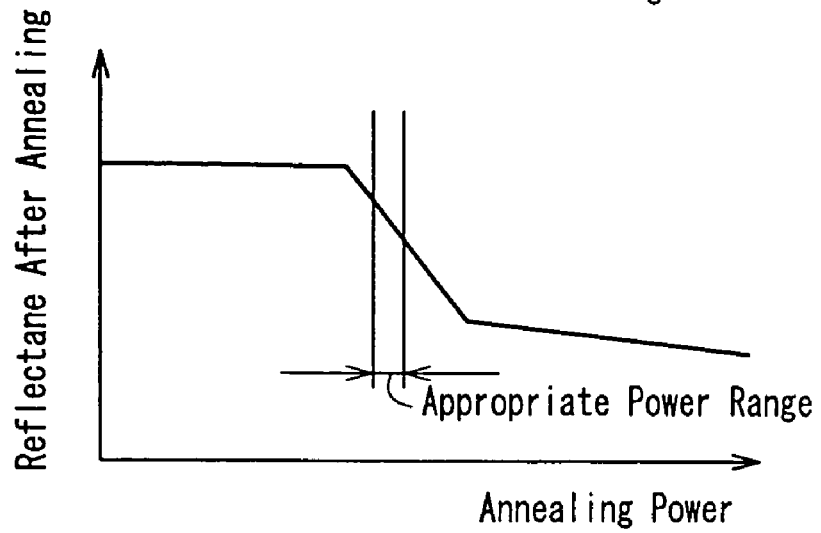
FIG. 6A is a diagram illustrating the annealing power and optical disk properties in the optical disk manufacturing methods according to the second and third embodiments of the present invention.

FIG. 6A schematically shows the relationship between the annealing power and reflectance after annealing. As long as there is insufficient annealing power, there is no change in the properties of the magnetic layer 208, and thus there is no change in reflectance after irradiation at that annealing power. However, if the annealing power is progressively raised, heat absorption at the layered thin film 200 causes the magnetic layer 208 to start annealing from the center of the land 203. Annealed areas drop in reflectance. Accordingly, if the annealing power is increased further, the annealing width increases, so there is a further drop in reflectance. If the annealing power is enlarged even more, the annealing width increases, but the increase diminishes due to the power intensity distribution and tends to become saturated.

Of course, delivering an even higher annealing power thermally destroys the layered thin film 200 and the substrate 201, but this is not illustrated in FIG. 6A. The optimal power range for the anneal is the range enclosed within the two straight lines in the diagram, and it should be clear that the optimal annealing power can be found by measuring the reflectance after irradiation at the annealing power for testing. It should be noted that what is here called the optimal annealing power is the annealing power at which the bit error rate, for example, is below a certain value when data are recorded to and reproduced from a track that has been annealed at different annealing power levels. To stabilize the annealing width, it is preferable that the shape of the lands 203 is stabilized as much as possible, because it is desirable that the lands 203 irradiated with the annealing power have a constant optical absorption, and as a result that the lands 203 reach a constant highest temperature. As a specific example of the optimal annealing power, values centered around 3.1 mW are obtained at $\lambda=405$ nm, a NA of 0.85, and a linear speed of 3 m/s. Naturally, this power level will change according to the disk configuration, linear speed, and groove structure, for example.

The change in reflectance may rise during annealing depending on the design of the layered thin film 200 of the optical disk. Also, to precisely find the annealing power, it is preferable that the layered thin film 200 of the optical disk 100 is designed such that there is a large change in reflectance after annealing.

A specific working example of the method for testing the annealing power is explained below. To find the optimal annealing power, the annealing device selects one of the outer periphery power testing region 106b, the data area power testing region 101b, and the inner periphery power testing region 105b, guides the annealing light beam 212 onto the land 203 of a track that has not been annealed, and performs a test of the annealing power with the annealing power control portion 506. One or a plurality of segments from non-annealed tracks in the selected power testing region are taken as a unit annealing region, and the annealing device executes the annealing test while changing the annealing power at each unit annealing region.

Figure 7A:
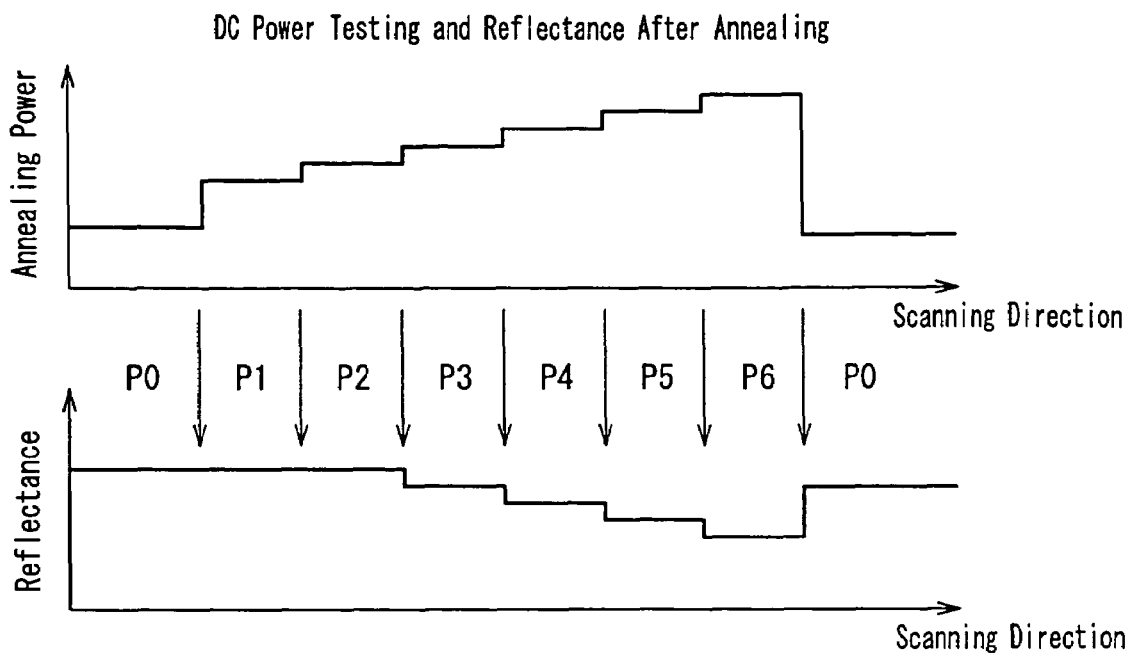
FIG. 7A is a diagram illustrating the power test of the optical disk manufacturing method according to the second embodiment of the present invention.

This operation is illustrated in FIG. 7A. P0 is the reproducing power and P1 to P6 are the annealing test power levels, which are given as DC-like constants for each unit annealing region. After performing the annealing by raising the annealing power in order from P1 to P6, the irradiation power is returned to the reproducing power P0. After irradiation at these annealing powers, the annealing device measures with the reflection power detector 505 the reflectance of each unit annealing region at which the annealing was tested. The lower diagram in FIG. 7A shows these results. The appropriate power range for annealing can be found by interpolation from the results of the measurement of each reflectance. Here, it seems that the central value of the appropriate power range is basically between the power P3 and the power P4. By annealing the optical disk 100 at the appropriate annealing power found above, it is possible to obtain a high density, highly reliable optical disk.

It should be noted that different values are measured for the reflectance depending on the location within the segment 102. Although the reflectance is measured easily taking an average of all values, it is preferable that the reflectance of the groove regions 104, which have to be annealed, is extracted and used. However, it may occur that the reflectance of the groove regions 104 cannot to be measured reliably due to the influence of, for example, cutting, molding, or forming films on the optical disk 100. This means that if considerable variations in the absorption or the observed reflectance during annealing are observed due to variations in the height (depth), width, fluctuation, surface precision, or angle of slope of the lands 203, then it is preferable that the reflectance of the mirror portion 213 in the pit region 103 is extracted and measured. This tendency can be ascertained by variations in the reflectance after annealing testing.

Also, when there are large variations in annealing power in the circumferential direction of the optical disk 100, at least one complete track is taken for the unit annealing regions, and the average of the reflectance is measured. Furthermore, when there are large variations in the reflectance, the appropriate power can be found at each circumferential direction and accumulated in a memory corresponding to the circumferential direction, and then when performing the annealing, a function can be added for using an annealing power based on this so-called one dimensional memory. The same process can be adopted for the value interpolated from the three appropriate powers (or when there are a plurality of data area power test regions 101b, a correspondingly greater number of appropriate power values) found for the radial direction as mentioned above, and the optimal annealing power within the disk surface can be input into a two-dimensional memory, making it possible to irradiate the annealing power accurately.

Although the tracks of the power testing region are not annealed, as long as the annealing test is not redone, when the test is redone, it is necessary to store on the annealing device side whether or not the tracks have been annealed. Also, it is possible to add a function, which, if there are defects in the disk and the data from the test of the annealing is unreliable, for example if the reflectance should have dropped in accordance with the annealing power but has not dropped, performs the annealing test again to determine a more accurate annealing power.

For revolving the optical disk 100, any of CAV, CLV, or MCLV are appropriate, and the servo format is not limited to the sample servo format, but the continuous composite servo format also can be adopted easily.

Also, in the example provided, the material for the second dielectric layer 209 was $Si_3N_4$ with a refractive index of 2.0, but for the material of the second dielectric layer 209, ZnSe with a refractive index of 2.6 or ZnS with a refractive index of 2.2 also can be used (the same also applies to the other embodiments). In this case, because the annealing laser light can be used efficiently even with a comparatively thin second dielectric layer 209, there is the advantage that the film formation time of the second dielectric layer 209 can be shortened.

Third Embodiment

The third embodiment illustrates an example of a method for manufacturing an optical disk of the present invention with a different power irradiation method during annealing power testing than that of the second embodiment. The third embodiment is different from the second embodiment in that in the second embodiment the power irradiation method during annealing testing was DC-like, but in the third embodiment it is AC-like. Other aspects are substantially the same as in the second embodiment, so that their further description has been omitted.

Figure 7B:
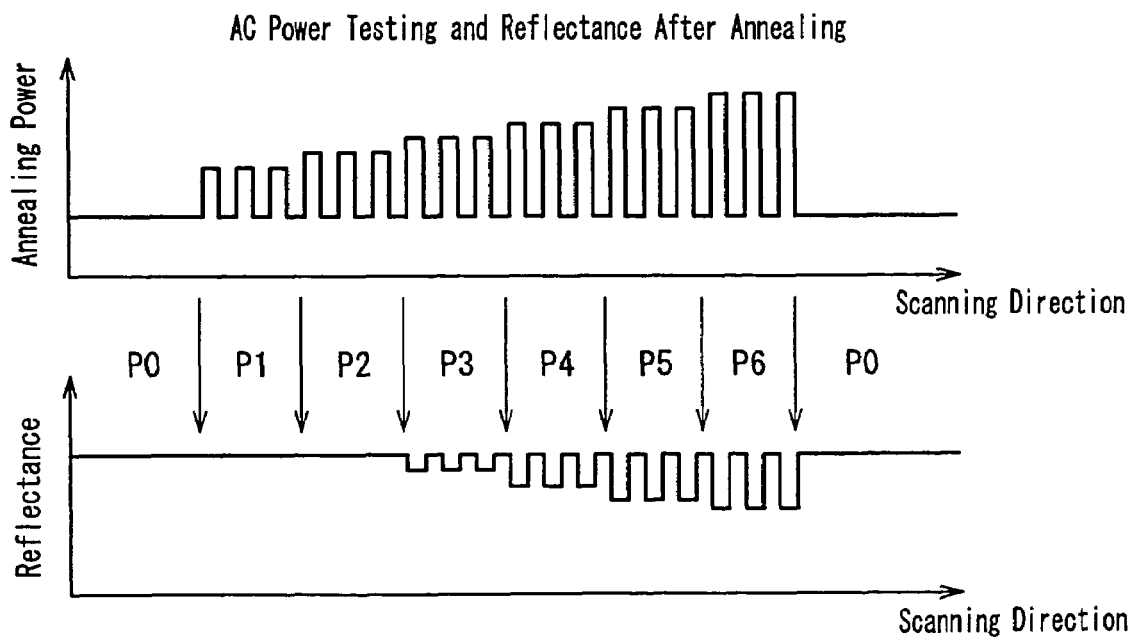
FIG. 7B is a diagram illustrating the same with respect to the third embodiment.

FIG. 7B shows how the annealing power during annealing testing is changed in the unit annealing regions between the annealing power and the reproducing power. It is preferable that the unit annealing regions are made of a plurality of segments, and at each segment the power is changed between annealing power and reproducing power. As the drawing shows, irradiation at the annealing power is changed alternately.

As in the second embodiment, after the laser beam of annealing power for testing is irradiated, the annealed locations are scanned at the reproducing power and their reflectance is measured by the reflection power detector 505. In FIG. 7B, the reflectance of the region annealed at the annealing power P3 starts to change for each segment at annealed locations and non-annealed locations. That is, at P3 the annealing power becomes effective and the lands 203 start to be annealed.

If annealing is carried out in alternately at each segment, as explained above, then, even if there are gentle reflectance non-uniformities in the circumferential direction, the change in reflectance depending on whether annealing was performed can be seen in very small regions at the segment level, so the starting point of the annealing can be located accurately without influence of the reflectance non-uniformities. It thus can be said that this is an effective method for performing an accurate measurement of the starting point of the annealing power. Also, AC-like detection permits a very precise measurement of the reflectance change, such as finding the integral of the reflectance profile, so the optimal annealing power can be determined with even higher precision. By annealing the optical disk 100 at the appropriate optimal annealing power found above, a high density, highly reliable optical disk can be obtained.

It should be noted that in the present embodiment, the segments were regarded as the unit for testing the anneal, but this unit also can be a region in which the segments are divided into smaller parts or a group of such regions. Also, there does not have to be a 1:1 ratio between the regions irradiated with the annealing light beam and the regions irradiated with the reproducing light beam.

Fourth Embodiment

The fourth embodiment describes an example of a method for finding the optimal annealing power in real time and controlling the annealing power in accordance with the optimal annealing power determined in the second and third embodiments for the optical disk manufacturing method of the present invention, even if the optimal annealing power is different at different locations, thus achieving an optimal annealing at each location.

In the following, the method for determining the optimal annealing power at the power testing regions is the same as that of the aforementioned second or third embodiments, so a further description thereof has been omitted.

Figure 6B:
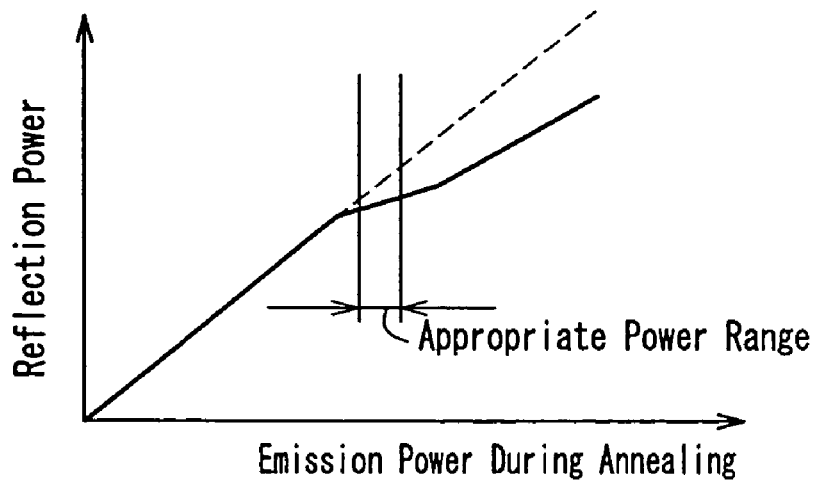
FIG. 6B illustrates the same with respect to the fourth and fifth embodiments.

The optical disk manufacturing method according to the fourth embodiment utilizes the relationship between the irradiation power and the reflection power during annealing, illustrated schematically in FIG. 6B. When the annealing power is low, there is a constant ratio between the irradiation power and the reflection power before annealing, but if the annealing power is increased and the annealing begins, then the absorption rate changes and the reflection power level decreases, and there is a decrease in the ratio between the irradiation power and reflection power. If the annealing power is raised even further, the absorption amount increases and there is a further decrease in the ratio between the irradiation power and the reflection power. When the annealing power has exceeded a certain level, the ratio between the irradiation power and the reflection power decelerates and becomes substantially constant. The optimal power range for annealing is the range sandwiched by the two straight lines in FIG. 6A. In the fourth embodiment, this characteristic is utilized and the annealing is carried out by controlling the annealing power such that the ratio between the irradiation power and the reflection power during annealing becomes an optimal value. This operation is described in FIG. 8.

Figure 8:
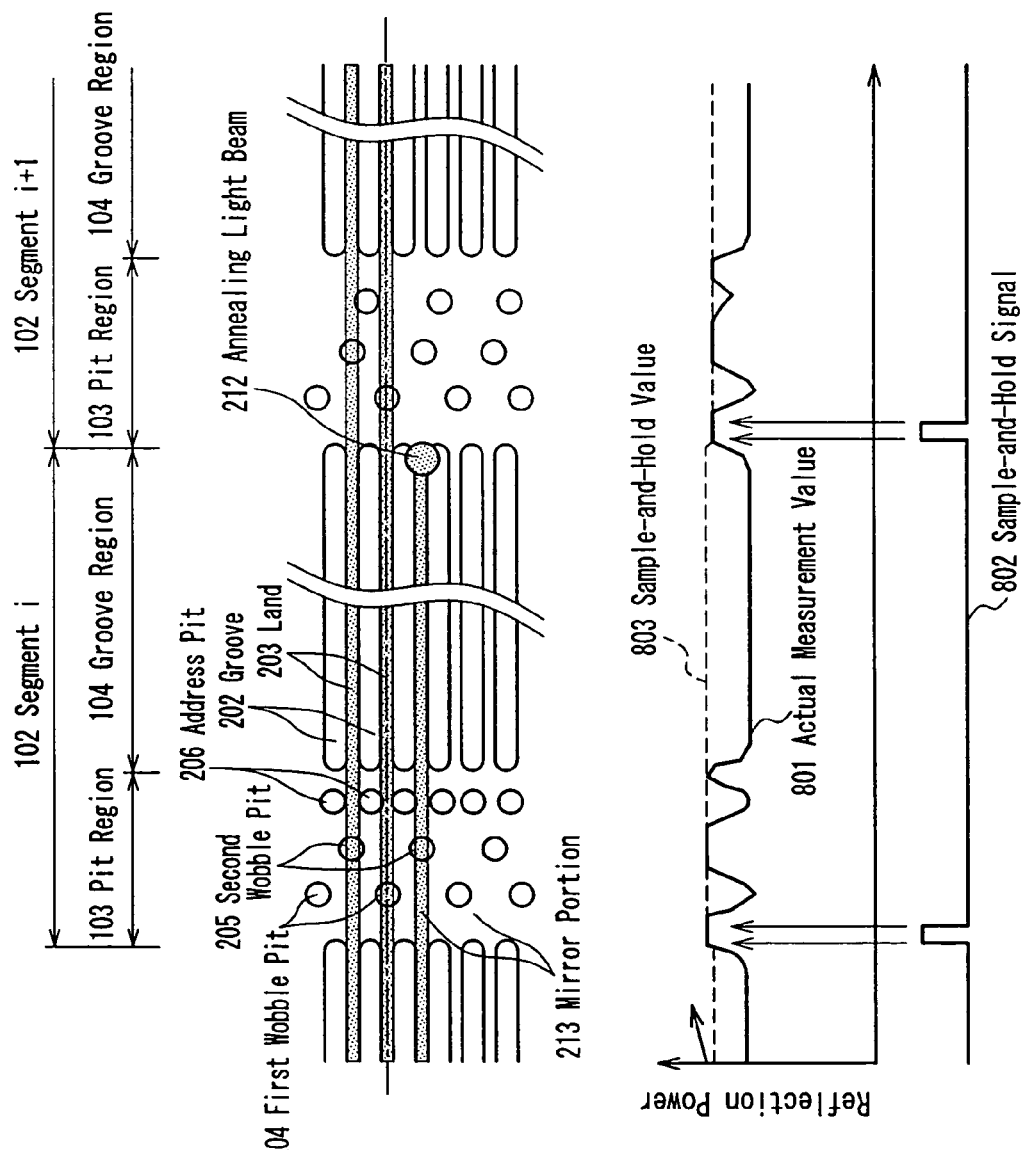
FIG. 8 is a diagram illustrating the power control of the optical disk manufacturing methods according to the fourth and fifth embodiments of the present invention.
Figure 9:
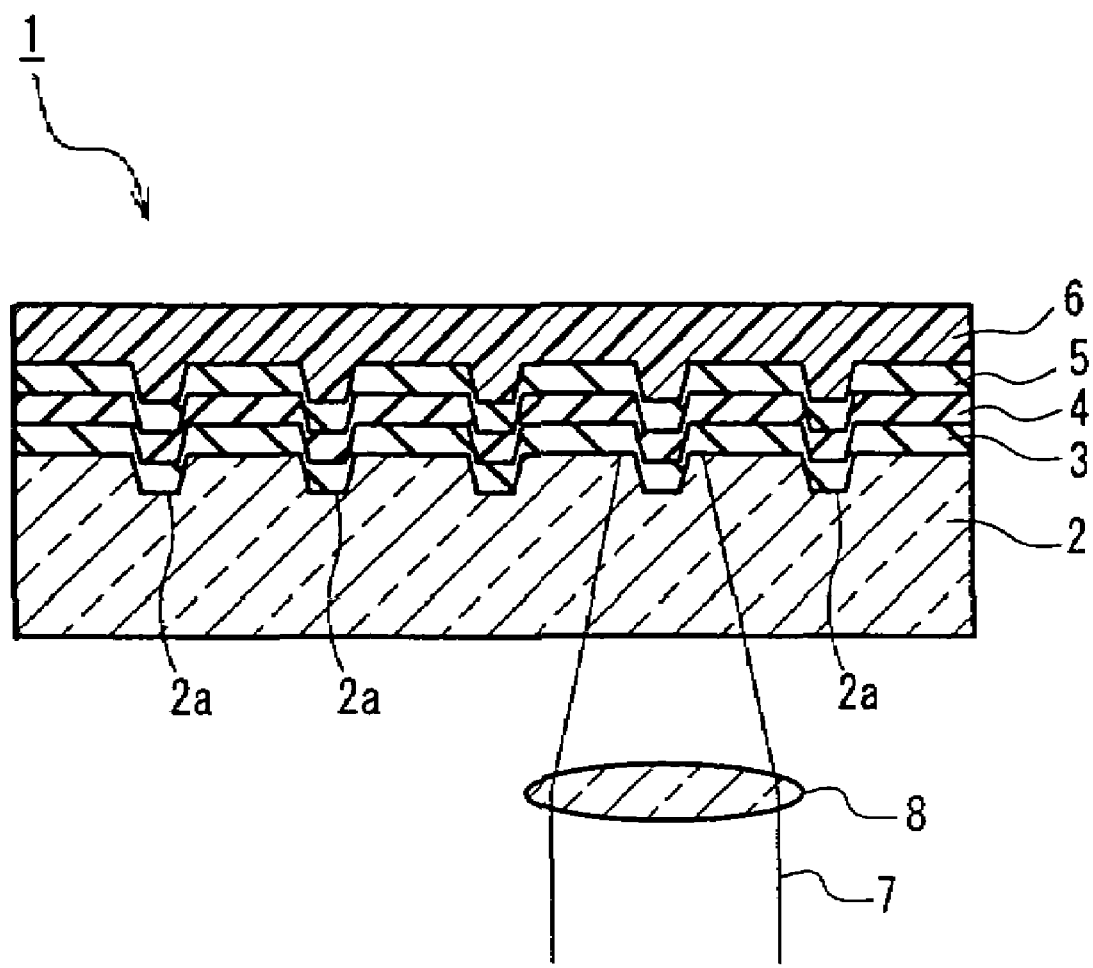
FIG. 9 is a cross-sectional view showing an example of a conventional optical disk manufacturing method.

In FIG. 8, the top diagram is a magnified view of the segment 102, the third land 203 from the top is in the process of being annealed, and the second land 203 from the top and the hatched region to the left side of the annealing light beam 212 are locations that have already been annealed. In the annealing process, the reflection power that is detected by the reflection power detector 505 corresponds to the actually measured value denoted by numeral 801 in the bottom diagram of FIG. 8. The annealing power control portion 506 compares the actual measurement value 801 and the irradiation power detected by the irradiation power detector 502, and controls the annealing power such that this ratio is changed and the annealing power becomes an optimal value. The actual measurement value 801 of the reflection power fluctuates as shown in the diagram when the pit regions 103 are traversed, so it is preferable to use the values of the grooves 104 (although the land 203 portions are where the reflection power is measured), where there is little fluctuation.

As explained above, with the present embodiment, annealing can be carried out by calculating the optimal annealing power at each location in real time, and thus an optical disk manufacturing method in which ideal anneal processing is preformed can be provided.

It should be noted that in a case where there are variations in the reflection power due to variations in the lands 203 with regard to height (depth), width, fluctuation, surface precision, and the angle of the slope, for example, the reflection power of the mirror portion 213, which is hardly affected during mastering, can be extracted with a sample-and-hold signal 802, and the sample-and-hold value denoted by numeral 803 can be used to control the annealing power with an even higher precision.

In addition to the embodiments of the present invention as described above, various modifications of the present invention will be apparent to the person skilled in the art. For example, in the embodiments, the method for testing the annealing power is effective also in a case further combining the application of magnetic fields or temperature control so as to increase the stability of the anneal.

It should be noted that in the description of the embodiments of the present invention, "optimal" was used with respect to annealing power, however, here "optimal" is not limited to a specific value and rather indicates a suitable value having a certain range.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. An optical disk, comprising:
   a first dielectric layer, a magnetic layer, and a second dielectric layer on a disk-shaped substrate in which pits and grooves have been embossed;
   wherein a data region used for recording/reproducing data comprises a plurality of tracks from an innermost track to an outermost track, each of the tracks comprising a plurality of segments, and each of the segments comprising a pit region and a groove region;
   wherein the pit regions have at least a pair of sample servo wobble pits and an address pit for the track address, and tracks provided in the data region for recording/reproducing data are made of grooves;
   wherein tracks are magnetically separated from one another by scanning a focused light beam over lands between tracks at a predetermined power and annealing to lower the magnetic anisotropy of the magnetic layer; and
   wherein the optical disk comprises a power testing region comprising one or more tracks for finding the predetermined annealing power at the location of at least one of the group consisting of a specific region within the data region, a region more to the inner side than the innermost track of the data region, and a region more to the outer side than the outermost track of the data region.

2. The optical disk according to claim 1, wherein the magnetic layer comprises at least a domain wall displacement layer, a switching layer, and a recording layer, formed in that order;
   wherein the Curie point of the switching layer is lower than the Curie point of at least one layer selected from the domain wall displacement layer and the recording layer; and
   wherein in regions of the switching layer that exceed the Curie point due to the irradiation of a reproducing light beam, the domain wall transferred to the domain wall displacement layer is displaced toward a high temperature region.

3. The optical disk according to claim 1, wherein by scanning over lands between tracks with a light beam that has been focused to be smaller than the light beam used for recording/reproducing, the magnetic anisotropy of magnetic layer located at the lands or at the lands and the line of extension thereof is made lower than the magnetic anisotropy of magnetic layer located at the grooves.

4. The optical disk according to claim 1, wherein the annealing is performed by irradiating laser light from the dielectric layers.

5. An optical disk manufacturing method, wherein the optical disk comprises a first dielectric layer, a magnetic layer, and a second dielectric layer on a disk-shaped substrate in which pits and grooves have been embossed, wherein a data region used for recording/reproducing data comprises a plurality of tracks from an innermost track to an outermost track, each of the tracks comprising a plurality of segments, and each of the segments comprising a pit region and a groove region, wherein the pit regions have at least a pair of sample servo wobble pits and an address pit for the track address, and tracks provided in the data region for recording/reproducing data are made of grooves; wherein tracks are magnetically separated from one another by scanning a focused light beam over lands between tracks at a predetermined power and annealing to lower the magnetic anisotropy of the magnetic layer, and wherein the optical disk comprises a power testing region comprising one or more tracks for finding the predetermined annealing power at the location of at least one of the group consisting of a specific region within the data region, a region more to the inner side than the innermost track of the data region, and a region more to the outer side than the outermost track of the data region, the optical disk manufacturing method comprising:

(1) a step in which a light beam is irradiated on the lands at a reproducing power that does not cause a reversible change with respect to the optical disk, is focused and subjected to tracking, and one of the power testing regions is chosen and one or a plurality of segments in the selected power testing region are taken as unit annealing regions, and light beams of annealing power for testing of different values larger than the value of the reproducing power are irradiated at each of the plurality of unit annealing regions;

(2) a step in which the predetermined annealing power appropriate for annealing is found from the difference in reflectance of the plurality of unit annealing regions created in step (1) and the reflectance of the unit annealing regions that are not irradiated by the light beams of annealing power for testing, by scanning at the reproducing power; and (3) a step in which at least the land portions at both sides of the tracks within the data region are scanned and annealed at the predetermined annealing power found in step (2).

6. The optical disk manufacturing method according to claim 5, wherein in step (1), the unit annealing regions comprise a plurality of continuous segments, in which one or more segments irradiated with a light beam of annealing power for testing and one or more segments irradiated with only a light beam of reproducing power are arranged in alternation, and step (2) comprises detecting very small changes in the reflectance alternately, even if there are reflectance variations in the revolving direction, by continuously scanning the unit annealing regions at the reproducing power.

7. The optical disk manufacturing method according to claim 5, wherein a plurality of power testing regions are chosen, the optimal annealing power for each power testing region is determined by carrying out the steps (1) and (2), the optimal annealing power considered appropriate for each disk radial position is calculated from the relationship between the radial position of the plurality of power testing regions and the optimal annealing power, and wherein the optimal annealing power in accordance with the radial position of the lands to be annealed is used in step (3).

8. The optical disk manufacturing method according to claim 5, wherein the annealing is performed by irradiating laser light from the dielectric layers.

9. An optical disk manufacturing method, wherein the optical disk comprises a first dielectric layer, a magnetic layer, and a second dielectric layer on a disk-shaped substrate in which pits and grooves have been embossed, wherein a data region used for recording/reproducing data comprises a plurality of tracks from an innermost track to an outermost track, each of the tracks comprising a plurality of segments, and each of the segments comprising a pit region and a groove region, wherein the pit regions have at least a pair of sample servo wobble pits and an address pit for the track address, and tracks provided in the data region for recording/reproducing data are made of grooves, wherein tracks are magnetically separated from one another by scanning a focused light beam over lands between tracks at a predetermined power and annealing to lower the magnetic anisotropy of the magnetic layer, and wherein the optical disk comprises a power testing region comprising one or more tracks for finding the predetermined annealing power at the location of at least one of the group consisting of a specific region within the data region, a region more to the inner side than the innermost track of the data region, and a region more to the outer side than the outermost track of the data region, the optical disk manufacturing method comprising:

(1) a step in which a light beam is irradiated on the lands at a reproducing power of a power that does not cause a reversible change with respect to the optical disk, is focused and subjected to tracking, and one of the power testing regions is chosen and one or a plurality of segments in the selected power testing region are taken as unit annealing regions, and light beams of annealing power for testing of different values larger than the value of the reproducing power are irradiated at each of the plurality of unit annealing regions;

(2) a step in which the predetermined annealing power appropriate for annealing is found from the difference in reflectance of the plurality of unit annealing regions created in step (1) and the reflectance of the unit annealing regions that are not irradiated by the light beams of annealing power for testing, by scanning at the reproducing power; and (3) a step in which a light beam of the predetermined annealing power found in step (2) is irradiated, and while controlling the annealing power such that the ratio of the irradiation power and the reflection power reflected from the disk becomes substantially constant, at least the land portions to both sides of the tracks within the data region are scanned and annealed.

10. The optical disk manufacturing method according to claim 9, wherein step (3) comprises irradiating the light beam of the predetermined annealing power onto pit regions in addition to the land portions, and controlling the predetermined annealing power such that there is a constant ratio between the reflection power at a mirror portion that is within the pit regions and is not affected by the pits and the emission power of the predetermined annealing power.

11. The optical disk manufacturing method according to claim 9, comprising, before step (3), irradiating a light beam of the predetermined annealing power onto unused segments or tracks that have not been irradiated with a light beam of annealing power, and determining in advance a substantially optimal value for the ratio between the irradiation power and the reflection power, and in step (3) controlling the annealing power such that the ratio between the irradiation power and the reflection power becomes the substantially optimal value.

12. The optical disk manufacturing method according to claim 9, wherein the annealing is carried out by irradiating laser light from the dielectric layers.

13. An optical disk, comprising:
a first dielectric layer, a magnetic layer, and a second dielectric layer on a disk-shaped substrate;
wherein a data region used for recording/reproducing data comprises a plurality of tracks from an innermost track to an outermost track, each of the tracks comprising a plurality of segments;
wherein tracks are magnetically separated from one another by scanning a focused light between tracks at a predetermined power and annealing to lower the magnetic anisotropy of the magnetic layer; and
wherein the optical disk comprises a power testing region comprising one or more tracks for finding the predetermined annealing power at the location of at least one of the group consisting of a specific region within the data region, a region more to the inner side than the innermost track of the data region, and a region more to the outer side than the outermost track of the data region.

14. An optical disk manufacturing method, wherein the optical disk comprises a first dielectric layer, a magnetic layer, am a second dielectric layer on a disk-shaped substrate;
wherein a data region used for recording/reproducing data comprises a plurality of tracks from an innermost track to an outermost track, each of the tracks comprising a plurality of segments;
wherein tracks are magnetically separated from one another by scanning a focused light beam between tracks at a predetermined power and annealing to lower the magnetic anisotropy of the magnetic layer; and
wherein the optical disk comprises a power testing region comprising one or more tracks for finding the predetermined annealing power at the location of at least one of the group consisting of a specific region within the data region, a region more to the inner side than the innermost tracks of the data region, and a region more to the outer side than the outermost track of the data region, the optical disk manufacturing method comprising:
(1) a step in which a light beam is irradiated on the optical disk at a reproducing power that does not cause a reversible change with respect to the optical disk, is focused and subjected to tracking, and one of the power testing regions is chosen and one or a plurality segments in the selected power testing region are taken as unit annealing regions, and light beams of annealing power for testing of different values larger than the value of the reproducing power are irradiated at each of the plurality of unit annealing regions;
(2) a step in which the predetermined annealing power appropriate for annealing is found from the difference in reflectance of the plurality of unit annealing regions created in step (1) and the reflectance of the unit annealing regions that are not irradiated by the light beams of annealing power for testing, by scanning at the reproducing power; and
(3) a step in which the portions at both sides of the tracks within the data region are scanned and annealed at the predetermined annealing power found in step (2).

15. An optical disk manufacturing method, wherein the optical disk comprises a first dielectric layer, a magnetic layer, and a second dielectric layer on a disk-shaped substrate;
wherein a data region used for recording/reproducing data comprises a plurality of tracks from an innermost track to an outermost track, each of the tracks comprising a plurality of segments;
wherein tracks are magnetically separated from one another by scanning a focused light beam between tracks at a predetermined power and annealing to lower the magnetic anisotropy of the magnetic layer; and
wherein the optical disk comprises a power testing region comprising one or more tracks for finding the predetermined annealing power at the location of at least one of the group consisting of a specific region within the data region, a region more to the inner side than the innermost track of the data region, and a region more to the outer side than the outermost track of the data region, the optical disk manufacturing method comprising:
(1) a step in which a light beam is irradiated on the optical disk at a reproducing power that does not cause a reversible change with respect to the optical disk, is focused and subjected to tracking, and one of the power testing regions is chosen and one or a plurality of segments is the selected power testing region are taken as unit annealing regions, and light beams of annealing power for testing of different values larger than the value of the reproducing power are irradiated at each of the plurality of unit annealing regions;
(2) a step in which the predetermined annealing power appropriate for annealing is found from the difference in reflectance of the plurality of unit annealing regions created in step (1) and the reflectance of the unit annealing regions that are not irradiated by the light beams of annealing power for testing, by scanning at the reproducing power; and
(3) a step in which a light beam of the predetermined annealing power found in step (2) is irradiated, and while controlling the annealing power such that the ratio of the irradiation power and the reflection power reflected from the disk becomes substantially constant, the portions at both sides of the track within the data region are scanned and annealed.

16. An optical disk, comprising:
a first dielectric layer, a magnetic layer, and a second dielectric layer on a disk-shaped substrate;
wherein a data region used for recording/reproducing data comprises a plurality of tracks from an innermost track to an outermost track;
wherein tracks are magnetically separated from one another by scanning a focused light beam between tracks at a predetermined power and annealing to lower the magnetic anisotropy of the magnetic layer; and
wherein the optical disk comprises a power testing region comprising one or more tracks for finding the predetermined annealing power at the location of at least one of the group consisting of a specific region within the data region, a region more to the inner side than the innermost track of the data region, and a region more to the outer side than the outermost track of the data region.

17. An optical disk manufacturing method, wherein the optical disk comprises a first dielectric layer, a magnetic layer, and a second dielectric layer on a disk-shaped substrate;
wherein a data region used for recording/reproducing data comprises a plurality of tracks from an innermost track to an outermost track;

wherein tracks are magnetically separated from one another by scanning a focused light beam between tracks at a predetermined power and annealing to lower the magnetic anisotropy of the magnetic layer; and wherein the optical disk comprises a power testing region comprising one or more tracks for finding the predetermined annealing power at the location of at least one of the group consisting of a specific region within the data region, a region more to the inner side than the innermost track of the data region, and a region more to the outer side than the outermost track of the data region, the optical disk manufacturing method comprising:

(1) a step in which a light beam is irradiated on the optical disk at a reproducing power that does not cause a reversible change with respect to the optical disk, is focused and subjected to tracking, and one of the power testing regions is chosen to define a plurality of unit annealing regions in the selected power testing region, and light beams of annealing power for testing of different values larger than the value of the reproducing power are irradiated at each of the plurality of unit annealing regions;

(2) a step in which the predetermined annealing power appropriate for annealing is found from the difference in reflectance of the plurality of unit annealing regions created in step (1) and the reflectance of the unit annealing regions that are not irradiated by the light beams of annealing power for testing, by scanning at the reproducing power; and (3) a step in which the portions at both sides of the tracks within the data region are scanned and annealed at the predetermined annealing power found in step (2).

18. An optical disk manufacturing method, wherein the optical disk comprises a first dielectric layer, a magnetic layer, and a second dielectric layer on a disk-shaped substrate;

wherein a data region used for recording/reproducing data comprises a plurality of tracks from an innermost track to an outermost track;

wherein tracks are magnetically separated from one another by scanning a focused light beam between tracks at a predetermined power and annealing to lower the magnetic anisotropy of the magnetic layer; and wherein the optical disk comprises a power testing region comprising one or more tracks for finding the predetermined annealing power at the location of at least one of the group consisting of a specific region within the data region, a region more to the inner side than the innermost track of the data region, and a region more to the outer side than the outermost track of the data region, the optical disk manufacturing method comprising:

(1) a step in which a light beam is irradiated on the optical disk at a reproducing power that does not cause a reversible change with respect to the optical disk, is focused and subjected to tracking, and one of the power testing regions is chosen defining a plurality of unit annealing regions in the selected power testing region, and light beams of annealing power for testing of different values larger than the value of the reproducing power are irradiated at each of the plurality of unit annealing regions;

(2) a step in which the predetermined annealing power appropriate for annealing is found from the difference in reflectance of the plurality of unit annealing regions created in step (1) and the reflectance of the unit annealing regions that are not irradiated by the light beams of annealing power for testing, by scanning at the reproducing power; and (3) a step in which a light beam of the predetermined annealing power found in step (2) is irradiated, and while controlling the annealing power such—that the ratio of the irradiation power and the reflection power reflected from the disk becomes substantially constant, the portions at both sides of the tracks within the data region are scanned and annealed.

* * * * *

UNITED STATES PATENT AND TRADEMARK OFFICE
CERTIFICATE OF CORRECTION

| | | |
|---|---|---|
| PATENT NO. | : 6,980,490 B2 | Page 1 of 1 |
| APPLICATION NO. | : 10/860671 | |
| DATED | : December 27, 2005 | |
| INVENTOR(S) | : Ishibashi et al | |

It is certified that error appears in the above-identified patent and that said Letters Patent is hereby corrected as shown below:

Column 23, line 25: "layer, am" should read --layer, and--
Column 26, line 34: "such-that" should read --such that--

Signed and Sealed this

Twenty-first Day of November, 2006

JON W. DUDAS
*Director of the United States Patent and Trademark Office*

UNITED STATES PATENT AND TRADEMARK OFFICE
CERTIFICATE OF CORRECTION

PATENT NO.         : 6,980,490 B2  
APPLICATION NO. : 10/860671  
DATED              : December 27, 2005  
INVENTOR(S)        : Ishibashi et al.

It is certified that error appears in the above-identified patent and that said Letters Patent is hereby corrected as shown below:

Column 23, line 25: "layer, am" should read --layer, and--  
Column 26, line 34: "such-that" should read --such that--

This certificate supersedes Certificate of Correction issued November 21, 2006.

Signed and Sealed this

Second Day of January, 2007

JON W. DUDAS  
*Director of the United States Patent and Trademark Office*